Nov. 4, 1969     W. HÄRTING     3,476,178

HOLLOW BODY

Filed June 19, 1967

INVENTOR
WERNER HÄRTING

BY *Dicke & Craig*
ATTORNEYS

United States Patent Office 3,476,178
Patented Nov. 4, 1969

3,476,178
HOLLOW BODY
Werner Harting, Schmiden, Wurttemberg, Germany, assignor to Daimler-Benz Aktiengesellschaft, Stuttgart-Unterturkheim, Germany
Filed June 19, 1967, Ser. No. 647,159
Claims priority, application Germany, June 24, 1966, D 50,382
Int. Cl. F28f *19/00;* F24h *3/00;* B23p *15/26*
U.S. Cl. 165—134                                        1 Claim

ABSTRACT OF THE DISCLOSURE

A hollow body, especially for use as a heat-exchanger in the lubricant cooling system for engines, in which several hollow structural elements, communicating with each other, are securely and adheringly connected to each other, for example, by soldering, and in which mechanical connecting means, for example, tie rods, are used in such a manner that the securing surfaces of the hollow structural elements are under the effect of the connecting means which are pre-stressed in the sense of the surface pressure; the mechanical connecting means, such as tie rods, are preferably located outside of the interior spaces of the hollow structural elements.

Background of the invention

Figure 1:
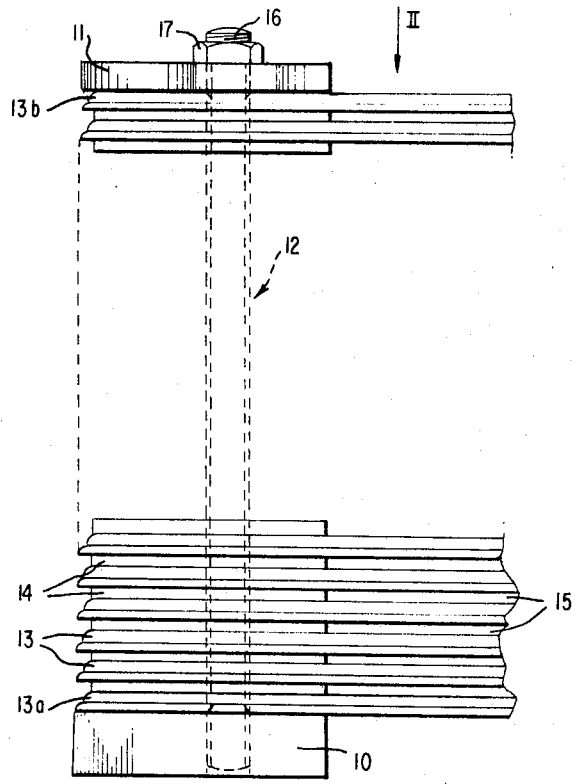

The present invention relates to a hollow body which is composed of several communicating hollow structural elements fixedly and adheringly connected with each other, especially to a tank or container for the accommodation of a flowing medium.

Such types of hollow bodies are used, for example, as heat-exchangers in the cooling system of engines.

Summary of the invention

The purpose underlying the present invention resides in improving a hollow body of the aforementioned type. For this purpose, provision is made according to the present invention that the adhering surfaces of the hollow structural elements, along which the same are connected with each other, are under the effect of mechanical connecting means pre-stressed in the sense of the surface pressure.

It is known, inter alia, to connect hollow structural elements of a heat-exchanger for the cooling system of the lubricant with each other by soldering in an adhering and fixed as well as fluid-tight manner. The particular advantage is achieved by the present invention that the vibrations and resonances acting on the hollow body are kept away from the adhering connections by the pre-stressed mechanical connecting means. In connection therewith, such types of oil coolers can also be installed, for example, in motor vehicles, without the occurrence of crack formations and leakages at the soldering places by reason of the vehicle vibrations.

Accordingly, it is an object of the present invention to provide a hollow body of the type described above which eliminates by simple means the shortcomings and drawbacks encountered with the prior art constructions.

Another object of the present invention resides in a hollow body, for example, for use as heat-exchanger for cooling the lubricant, which offers greatly improvde characteristics as regards rigidity and tightness compared to the known prior art devices.

A further object of the present invention resides in a hollow body, especially for use as heat-exchanger in the cooling system of engines, which is far-reachingly protected against vibrations and resonances occurring in the vehicle.

Still another object of the present invention resides in a hollow body of the type described above in which the formation of cracks as well as leakages at the solder places are avoided in an effective manner.

A further object of the present invention resides in a hollow body of the type described above for use as a heat-exchanger in which the aforementioned aims end objects are achieved without impairing the flow conditions for the medium flowing through the heat-exchanger.

Still a further object of the present invention resides in a heat-exchanger for use with the lubricating systems of internal combustion engines which excels by increased length of life.

Figure 2:
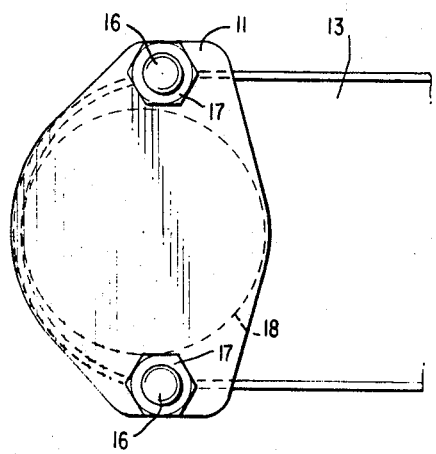

These and further objects, features and advantages of the present invention will become more obvious from the following description when taken in connection with the accompanying drawing which shows, for purposes of illustration only, one embodiment in accordance with the present invention, and wherein:

FIGURE 1 is a partial elevational view of a heat-exchanger for the lubricant of an internal combustion engine in accordance with the present invention; and FIGURE 2 is a plan view of the heat-exchanger taken in the direction of arrow II of FIGURE 1.

Referring now to the drawing wherein like reference numerals are used throughout the two views to designate like parts, and more particularly to FIGURE 1, the heat-exchanger illustrated therein is provided with a lower plate-shaped flange 10 for the securing at the housing of the internal combustion engine and with an upper plate-shaped abutment 11 for the clamping of two tie or connecting rods generally designated by reference numeral 12. Shell-shaped hollow structural elements 13 and spacer pieces 14 are alternately stacked on one another between the plate-shaped parts 10 and 11. Each spacer piece 14 is adheringly connected in a pressure- as well as fluid-tight manner with its adjacent hollow structural element 13 by soldering. Also, the hollow structural elements 13a and 13b at the end faces of the heat-exchanger are connected in a similar manner with the adjoining flange 10 and the abutment 11, respectively.

The inner flow and connecting channels for the lubricant to be cooled have been omitted in the drawing for sake of clarity.

Intermediate spaces 15 are formed by the spacer pieces 14 between the hollow structural elements 13 through which flows the cooling medium of the heat-exchanger.

The tie or connecting rods 12 are each constituted by necked-down expansion screws or bolts 16 which are threadably connected at this end with the flange 10 and are secured at the abutment 11 by means of nuts 17.

By tightening the nuts 17, a preselected and predetermined pre-stress can be produced in the sense of the surface pressure between the circularly shaped securing and adhering surfaces, indicated in dash and dot line at 18, of the individual soldered connections.

The tie rods 12 extend externally or outside of the surfaces 18 and therewith also outside of the interior hollow spaces and channels of the heat-exchanger. By such an arrangement, the flow conditions for the lubricant are not impaired by the tie rods 12. Simultaneously therewith, the rigidity of the heat-exchanger and the length of life of the soldered connections determined by the dynamic loads thereof are increased by the eccentric arrangement of the tie rods 12 in relation to the surfaces 18. The natural frequency of resonance of the cooler can be displaced within wide limits by the selection of appropriate sizes of tie rods.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. An oil cooler particularly adapted for use in internal combustion engines of motor vehicles, comprising a plurality of hollow structural elements and spacer means stacked in alternating manner, each of said spacer means being secured to adjacent hollow structural elements by means of soldering, plate-shaped abutment members secured, by soldering, to the respective hollow structural members at each end of the stacked arrangement, and prestressed mechanical connecting means inserted through aligned transverse bores provided in said stacked hollow structural elements and said plate-shaped abutment members subjecting the soldered surfaces between said spacer means and adjacent hollow structural elements to a surface pressure of a predetermined magnitude, whereby damage from vibrations is effectively precluded.

References Cited

UNITED STATES PATENTS

| | | | |
|---|---|---|---|
| 802,294 | 10/1905 | Karnaghan | 165—130 |
| 1,022,620 | 4/1912 | Carilberg | 165—130 |

ROBERT A. O'LEARY, Primary Examiner

ALBERT W. DAVIS, Assistant Examiner

U.S. Cl. X.R.

29—157.4; 165—130, 148, 173